United States Patent
Benhadda et al.

(10) Patent No.: US 8,666,898 B2
(45) Date of Patent: Mar. 4, 2014

(54) VISUAL INFORMATION RETRIEVAL SYSTEM FOR APPLYING SELF ORGANIZING MAPS/SOM USING FIVE DISTINCT MODULES THAT MERGE THE BEST MAPS

(75) Inventors: Hamid Benhadda, Colombes (FR); Mustapha Lebbah, Aubervilliers (FR); Nistor Grozavu, Paris (FR); Younes Bennani, Paris (FR)

(73) Assignees: THALES, Neuilly sur Seine (FR); Universite Paris 13, Villetaneuse (FR)

( * ) Notice: Subject to any disclaimer, the term of this patent is extended or adjusted under 35 U.S.C. 154(b) by 331 days.

(21) Appl. No.: 13/139,005

(22) PCT Filed: Dec. 9, 2009

(86) PCT No.: PCT/EP2009/066702
§ 371 (c)(1),
(2), (4) Date: Oct. 3, 2011

(87) PCT Pub. No.: WO2010/066774
PCT Pub. Date: Jun. 17, 2010

(65) Prior Publication Data
US 2012/0131026 A1     May 24, 2012

(30) Foreign Application Priority Data
Dec. 10, 2008  (FR) .................................. 08 06947

(51) Int. Cl.
*G06F 17/00*     (2006.01)
(52) U.S. Cl.
USPC .......................................................... 705/45
(58) Field of Classification Search
USPC .................................. 706/12, 45, 47, 20, 62
See application file for complete search history.

(56) References Cited

U.S. PATENT DOCUMENTS 5,911,069 A * 6/1999 Beard ............................ 719/315
2007/0282684 A1* 12/2007 Prosser et al. ................... 705/14

OTHER PUBLICATIONS

Chang K-C et al.: "Grey relational analysis based approach for data clustering", IEE Proceedings: Vision, Image and Signal Processing, Institution of Electrical Engineers, GB, vol. 152, No. 2, Apr. 8, 2005, pp. 165-172, XP00602366.
Yo-Ping Huang et al.: "Content-based image retrieval using grid-based indexing and grey relational analysis", Systems, Man and Cybernetics, 2008. SMC 2008. IEEE International Conference on, IEEE, Piscataway, NJ, USA, Oct. 12, 2008, pp. 2694-2699, XP031447495.
Kui Cao et al.: "Appling grey relational analysis to the relevance feedback in content-based image retrieval", Grey Systems and Intelligent Services, 2007. GSIS 2007. IEEE International Conference on, IEEE, PI, Nov. 1, 2007, pp. 475-479, XP031210428.

* cited by examiner

*Primary Examiner* — David Vincent
(74) *Attorney, Agent, or Firm* — Baker Hostetler LLP

(57) ABSTRACT

A system for information retrieval within a database of large size includes a first module for extracting the descriptors associated with each object in the database, and for constructing a table containing the objects and the value of a descriptor associated with an object. The system also includes a second module for applying a number of classification algorithms, for each of the tables obtained from the module, a third module to fusion the results obtained from the module in order to determine, for each type of descriptor, a class number associated with an object, a fourth module for finding which column of a table is closest to the column obtained during the first fusion of the step, and for selecting the map that is closest contained in the table, or best map, and a fifth module to fusion the aggregate "best maps", and applying an algorithm for searching for the best map to be transmitted to a display means.

5 Claims, 6 Drawing Sheets

VISUAL INFORMATION RETRIEVAL SYSTEM FOR APPLYING SELF ORGANIZING MAPS/SOM USING FIVE DISTINCT MODULES THAT MERGE THE BEST MAPS

CROSS-REFERENCE TO RELATED APPLICATIONS

This application is a National Stage of International patent application PCT/EP2009/066702, filed on Dec. 9, 2009, which claims priority to foreign French patent application No. FR 08 06947, filed on Dec. 10, 2008, the disclosures of which are incorporated by reference in their entirety.

FIELD OF THE INVENTION

The subject of the present invention relates to a system and method allowing a search of visual information of objects within a large multi-modal database (images, videos, signals, documents, etc.).

The invention relates generally to the display of images, texts when the database consists of AFP dispatches for example, or of audio signals when the database relates to communication records, for example, etc. More generally, the system according to the invention is used in the field of the searching for visual information in multi-modal data, and allows a faster browsing and searching, in the databases, due to a better structuring of the database in the form of uniform classes of objects in this database.

Hereinafter in the description, the invention is illustrated as an example on the basis of images dataset obtained from the Wikipedia images database. The term "image" is used to designate an image in a database, the image being described by a number of descriptors or attributes, such as its texture, its color, the text associated with this image, etc.

The term "best map" corresponds to the definition of a map with a high quality index. This index is calculated between the consensus partition obtained in the step E5 described hereinbelow and the initial maps obtained in the step E2. It is possible to use different indices depending on the descriptors extracted in the step E1: correlation, purity index, rank index, etc.

The expression "large size" refers to the two dimensions of a database (rows=observations and columns=variables), the number of rows being of the order of several millions of images and the number of columns being of the order of several thousands.

An SOM map is a map known to those skilled in the domain which corresponds to a self-adaptive or self-organizing map which is a class of artificial neural network based on unsupervised learning methods. It is often designated by the term self organizing map (SOM), or else Kohonen map. The function of the algorithm implemented by a map is to classify objects.

BACKGROUND OF THE INVENTION

The mass of data collected each day is becoming increasingly great. Currently, studies estimate that the quantity of information in the world is doubling every twenty months. The web and the digital libraries are giving birth to new issues in the fields of databases (DB) and information retrieval (IR) within these databases. In many applications, it is becoming important, even necessary, to make access to the information easier through systems for assisting in web browsing, systems for assisting in the formulation of requests for searches in the databases, for filtering, customizing and personalizing this information.

The prior art discloses various systems and techniques for searching for images or information. The conventional methods for image retrieval are usually based on principles related to linguistic indexing techniques (keywords) (ie, a pre-annotation text linked to images) without taking into account the information content or structural description such as the texture, the color, the density, the shape, the latent contours, etc., for image searches in a database.

Most of the methods use only the keywords associated with the images to make the classification. They also usually use classification techniques such as the averaging algorithms known by the abbreviated expression "k-means" in which the number of classes to be found and the centers (mobile) of these classes must be defined arbitrarily. Such techniques imply an instability in the results depending on the original parameter settings (sensitivity of the algorithms to the starting points). Other methods use other parameters such as the color or the texture separately without combining them and they do not include any backtracking to refine the results obtained results.

SUMMARY OF THE INVENTION

The idea of the present invention consists in offering a method and a system allowing to meet the expectations of the users and to resolve issues such as:

how to access, as rapidly as possible, to a multidimensional data or to a dataset, in a voluminous multimodal data base (signals, speech, image, video, documents, etc.)?

how to organize the archiving of a large multimodal database and thus to allow a rapid access when searching for an object in this database and to offer a number of responses with ascending degrees of relevance to the request?

how to synthesize the multimodal database in the form of a map summarizing its content?

how to improve the process and improve the responses to the requests by taking into account possible interactions with a user.

The invention relates to a system for information retrieval within a database of large size, including a processor and inputs/outputs, said system being characterized in that said processor comprises at least the following elements:

a first module $E_1$ suitable for extracting the descriptors associated with each object in the database, and for constructing a table containing the objects and the value of a descriptor associated with an object, and do so for the descriptors chosen for the representation of the object, a second module $E_2$ suitable for applying a number of classification algorithms SOMi, for each of the tables $T_{Tk}$ obtained from the module $E_1$, in order to assign, for each object Oi, a class number xij, for an algorithm SOMi that is applied, for each category of descriptors, a third module $E_3$ suitable for merging the results obtained from the module $E_2$ in order to determine, for each type of descriptor Tk, a class number associated with an object Oi, a fourth module $E_4$, suitable for finding which column SOMi of a table $T_{Sf}$ is closest to the column obtained during the first merging of the step $E_3$, and for selecting the map SOMi that is closest contained in the table $T_{Sf}$, or best map SOMi, a fifth module $E_5$ suitable for merging the aggregate "best maps" SOMi, and applying an algorithm for searching for the best map SOMf to be transmitted to a display means.

The used fusion algorithm is, for example, the relational analysis algorithm.

The object is an image and the extracted attributes are chosen from the following list: texture, color.

After the fusion step executed in the module $E_3$, the method returns to search for the best map of type 1, then the best map of type N, etc.

According to another variant, after the fusion step executed within the module $E_3$, the method takes the K results obtained from the fusion and merges them together by using a fusion technique, in order to obtain a single compromise partition to search for the best map for a type of descriptor.

BRIEF DESCRIPTION OF THE DRAWINGS

Other features and advantages of the present invention will become more apparent from reading about a nonlimiting exemplary variants and by referring to the figures which represent.

DETAILED DESCRIPTION

In order to better understand the object of the present invention, the following example will be given for a problem involving searching for and rapidly accessing visual information in a database of images described by a set of numerical descriptors (color descriptors, texture descriptors, etc.) and text descriptors (several thousand words extracted from web pages). The term object is therefore used, in this example, to designate an image in the database. The terms object and data are used interchangeably to designate an element of a database.

Figure 1A:
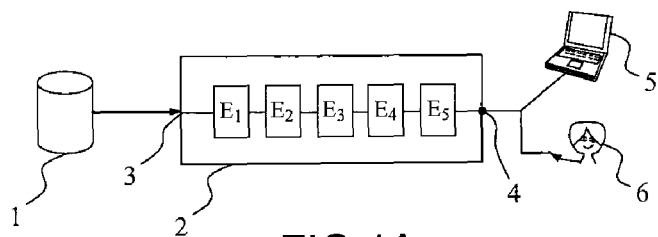
FIGS. 1A and 1B, an exemplary structure of a for implementing the method according to the invention, and a block diagram of the various phases implemented by the method, FIG. 2, a representation of the sequencing of the various steps implemented by the method according to the invention, FIG. 3, the steps for preprocessing operations and extraction of characteristics, FIG. 4, the steps for classification (by a number of algorithms) and recoding of the data by category, FIG. 5, the fusion of the various classification and consensus search results, and FIG. 6, the final fusion, the search for the final consensus and the selection of the best map allowing for the navigation and information retrieval in a large database.

Thus, FIG. 1A schematically represents an example of system according to the invention which includes the database 1 containing a large number of images, from which the information must be sought. The image database 1 is linked to a processor 2 which will comprise various modules suitable for implementing the steps $E_1$, to $E_5$, including a relational analysis module and one or more self-organizing map modules, better known by the abbreviation SOM. The database 1 and the processor 2 are, for example, implemented in a recognition system comprising inputs/outputs 3, 4. The output 4 may be linked to a human-machine interface, which, for example, allows to display the results 5 and/or the possibility of entering different types of request via an operator 6.

Figure 1B:
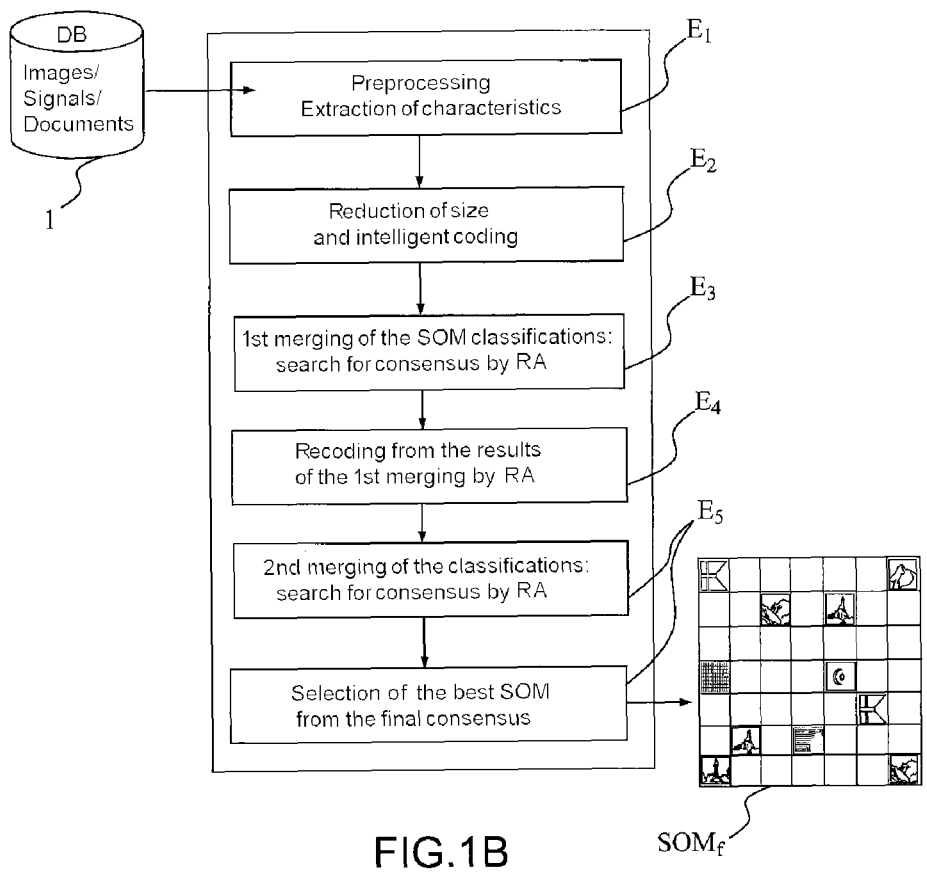

FIG. 1B is a summary of the various steps of the method, detailed in the following figures. The method takes as input large databases 1, images, signals, documents, or similar datasets. The first step $E_1$ consists in extracting characteristics or descriptors associated with the stored objects or data. The second step $E_2$ will consist in reducing the size of the object description space, by recoding each object, for each type of descriptor k, by as many numbers as there are SOM algorithms used for the recoding. Each number ni corresponds to the class to which this object belongs by the algorithm SOMi. A recoding of the data is therefore obtained in spaces of the classifications. During the third step $E_3$, the method will merge the classifications by implementing a consensus search algorithm which may be implemented by a relational analysis, a method known to those skilled in the art which will not be detailed. During a fourth step $E_4$, the method will then recode the data obtained from the first fusion, then the fifth step $E_5$ consists in selecting the best self-adaptive map or SOM that allows for a simplified and rapid display and browse within the database.

Figure 2:
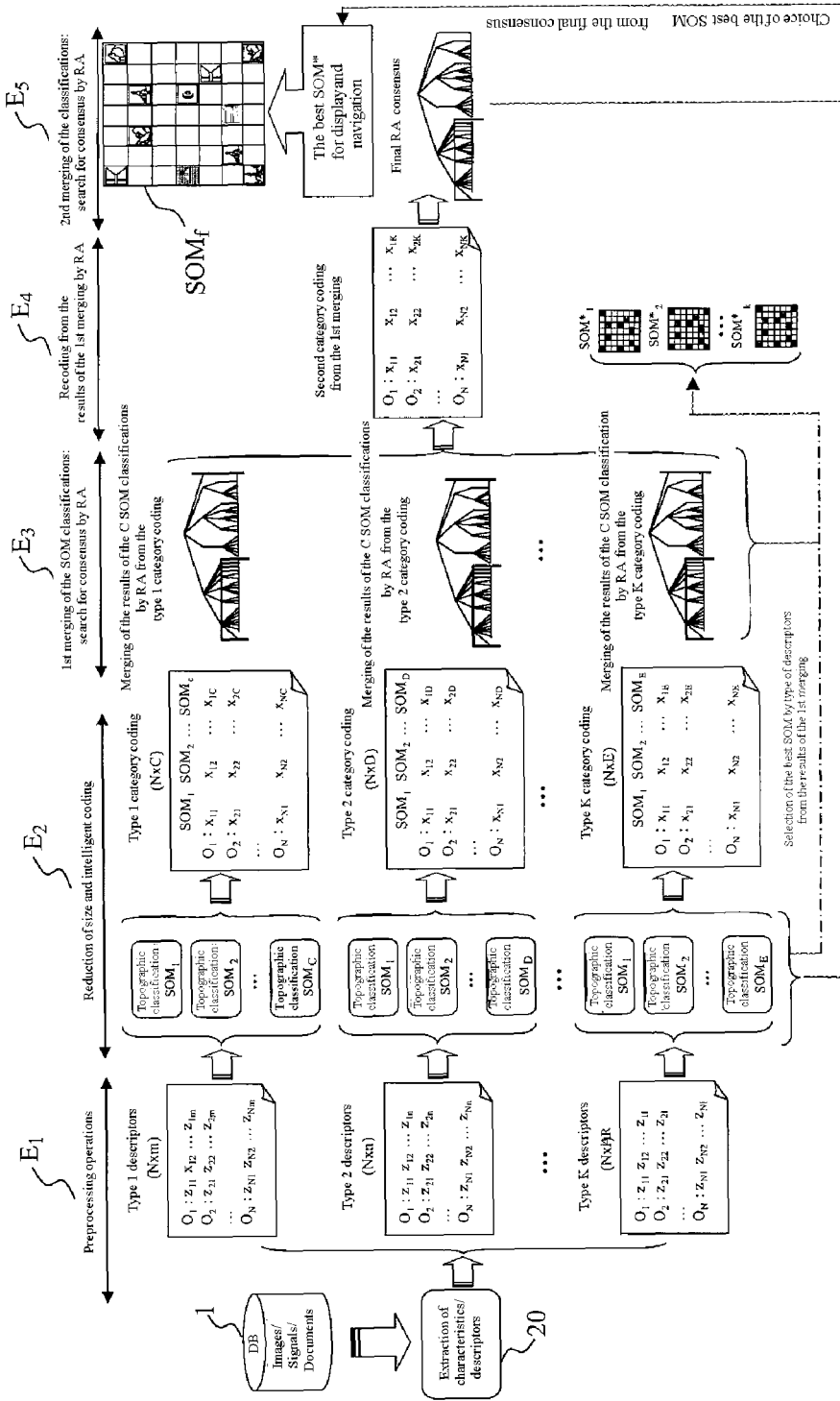

FIG. 2 represents the sequencing of the steps $E_1$ to $E_5$ executed in the modules $E_1$ to $E_5$ which will be detailed in FIGS. 3 to 6.

Figure 3:
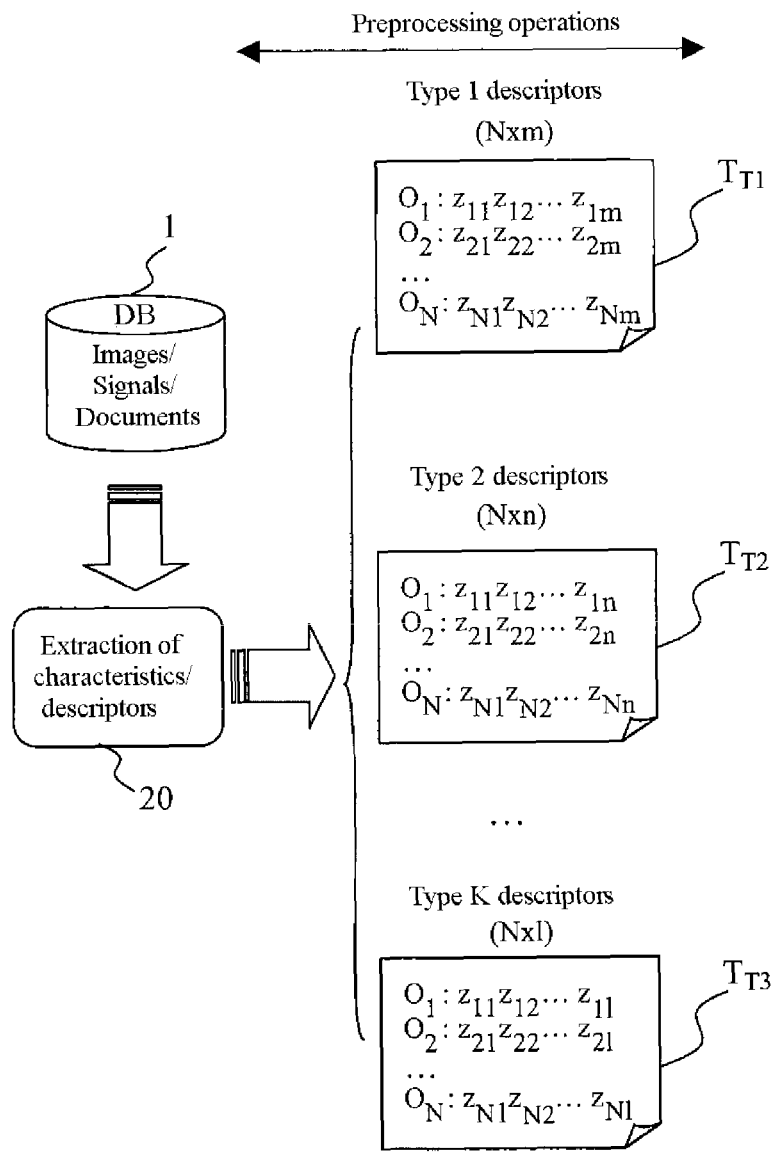

FIG. 3 details the steps executed by the processor 2 for the first phase. The data from the large database are transformed by adapted preprocessing operations in order to extract 20 characteristics or attributes relative to each descriptor (color, texture, etc.) for each object. The objects contained in the database are referenced Oi. These objects Oi are thus described by a set of descriptors, for example of K types. After this step, the processor has available to it K tables $T_{TK}$ of data or elements zij, each consisting of N rows which correspond to the number of data Oi contained in the database DB, 1, and a variable number of columns. The number of columns varies according to the type of indicators. The attributes used to describe an indicator (or descriptor) are not necessarily the same. In practice, the number of attributes to describe the color descriptor is not necessarily the same as that used to describe the texture descriptor, for example.

An element zij of the table corresponds to a value obtained by the extraction step. For example, if all the colors are considered as a type of descriptor, the attributes will each correspond to a color and the element zij will be the value associated with a given color for the object Oi.

The results of the first step $E_1$ are therefore presented in the form of K tables $T_{TK}$ of data zij which will be segmented thereafter by using a number of unsupervised automatic classification algorithms (FIG. 4), better known by the acronym SOM. These algorithms may be variants of the SOM algorithm. Each table $T_K$ of data zij obtained from a type of descriptor k will be segmented by a number of algorithms SOMi. The number of algorithms SOMi applied to each table Tk is chosen by the user. It may vary for each descriptor. The algorithms applied to each descriptor may vary, or be the same, from one descriptor to another.

Figure 4:
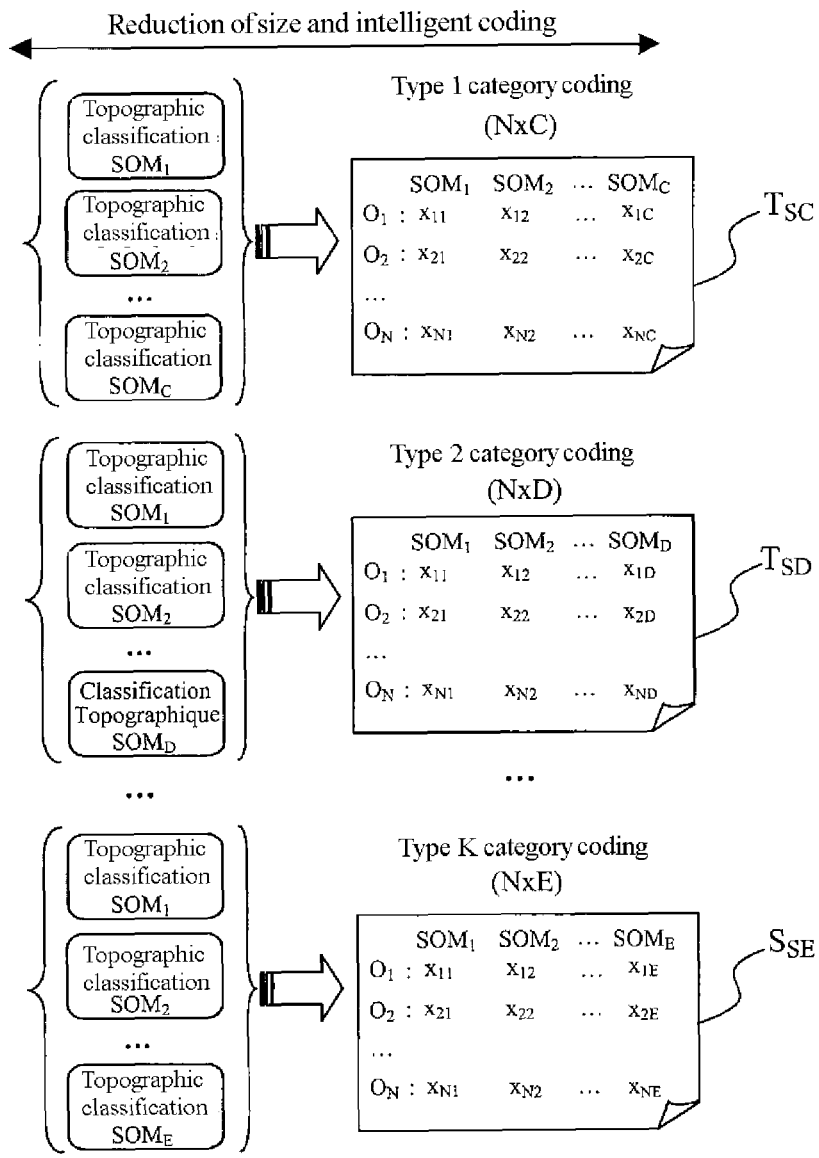

FIG. 4 details the application of a number of algorithms SOMi to the K tables Tk of FIG. 3.

The application of a number of algorithms SOMi generate classifications which allow to reduce the size of the data space (the dimension of the space in which the search and browsing will be conducted) and offer a smaller size category coding. Thus, initially, it is possible to have hundreds of attributes (or columns) which each describe K indicators (or descriptors). After application of the various algorithms SOMi, there will be as many columns (much smaller number than the starting attributes, hence the reduction) as there are applied SOMi algorithms. The data will be described by the category numbers (or classes) for each algorithm. The objects Oi of a table will be described by the category numbers for each algorithm. An element xij of the table corresponds to the class number to which the object Oi belongs after application of the algorithm j. Indeed, a map is a simplified view of all the images in the database. Indeed, if the map is in the form of a two-dimensional view (13×13), there will be 169 representative images from the original database (which represents 169 classes). However, it must be noted that each image of these 169 images of the map hide (or represent) a number of other images in the database. All the hidden images (or represented) by image number n will have as their number (or belong to the class) n.

The result of the classification step in the case of the application of the SOM algorithm is a two-dimensional topological map in which each referent object is considered as a neuron represented by a prototype vector of the same dimension as the data. In fact, each algorithm SOMi gives for its result a two-dimensional topological map $T_{SI}$ and each nueuron (or element) of the map will have a number which will identify all the data xij represented by this neuron, in which s is an index to designate the application of an algorithm SOM and I the number of used algorithms.

In the step $E_2$, after having reduced the size of the description space by using a number of algorithms SOMi, the method will recode each element of the tables. This is illustrated in FIG. 4. The example given in this figure shows the application of a number of algorithms SOMi, for each object Oi, corresponding to different topographic classifications. For each element of a table $T_{SI}$, and each classification from 1 to C, 1 to P, 1 to D, in the figure, SOM1, . . . SOMi, with i=C or P or D, the method will recode the elements xij of the table, for each type of descriptor of type 1 to K. This recoding consists in representing each object Oi by a vector having as many components as there are used SOM algorithms. A component xij obtained by recoding corresponds to the number of the class to which the object Oi belongs in the map SOMj; it is also equal to the number of the prototype neuron closest to this object in the original description space. At the end of this recoding, the processor has, for each type of descriptor k, a table of data $T_{SI}$ having a number of rows (always the same, equal to the number N of objects Oi in the database), a number of columns corresponding to the number of algorithms SOMi applied for each type of descriptor. In the figure, this is illustrated by the dimension N×C for the table $T_{SC}$, N×D for the table $T_{SP}$ and N×E for the table $T_{SD}$, with C, D and E representing the number of SOM algorithms used for each type of descriptor.

Figure 5:
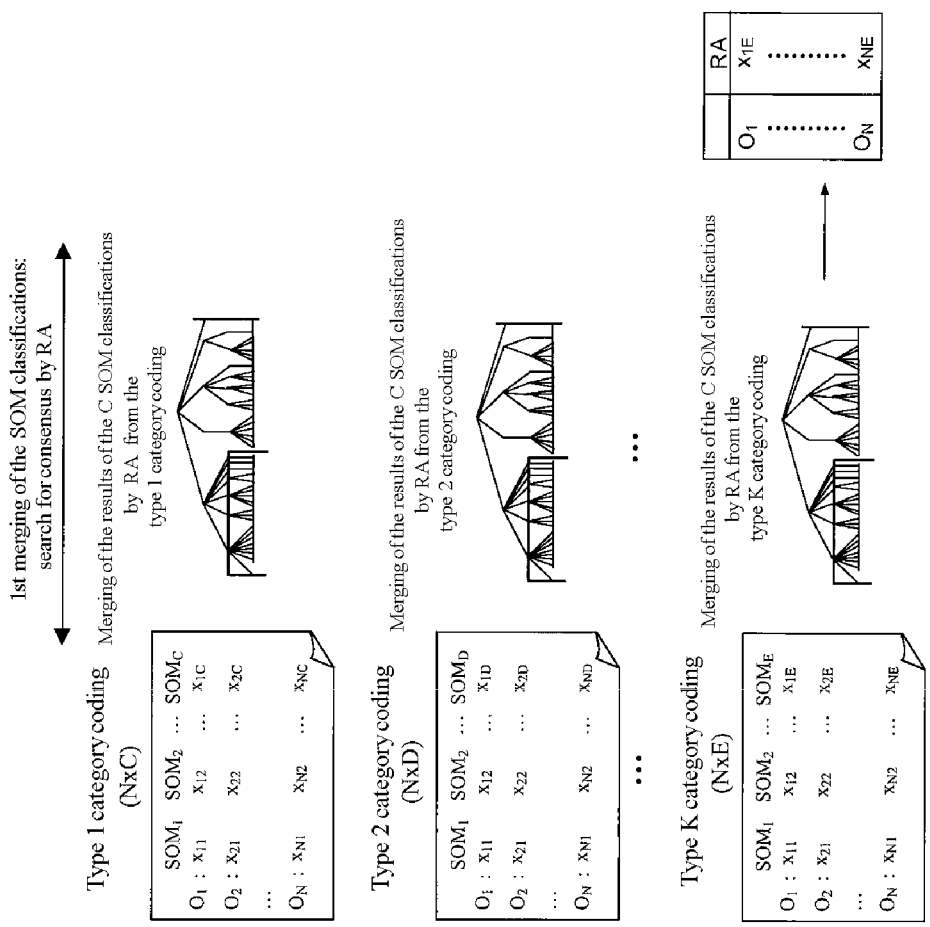

FIG. 5 details the steps implemented in the step corresponding to the first fusion of the classifications SOMi. This step implements a relational analysis algorithm known to those skilled in the domain or, more generally, it may implement any type of fusion algorithm having functions similar to those offered by relational analysis. For each descriptor k, the table of data T'k is subjected to a relational analysis in order to determine a consensus between the different classification results by the SOMi. This is the first fusion step in the method. This step may also be seen as a meta-classification whose final result is a compromise classification. The principle of the relational analysis is to find a result that conforms to most of the expressed opinions (in general). In the presented example, it concerns classification, and therefore the result of the relational analysis will be to place in the same class all the images or objects of the database that have been put together in the same class by the majority of the used SOMi algorithms.

Thus, in FIG. 5, the recoded data contained in the first table $T'_{SC}$ for each SOMi, for i varying from 1 to C, for example, will be subjected to a relational analysis algorithm which will give as result the closest possible classification of all the classifications obtained by the algorithms SOMi i=1, . . . , C applied to each type of descriptor. A two-column table is thus obtained, the first column designating the objects Oi and the second column the cluster's number, the class to which the object belongs. The letters RA correspond to the relational analysis operation applied to a table.

At this stage, there are two possible variants:
1) the first variant consists, for each descriptor, in returning to the starting SOMi (the distances between the compromise partition obtained by the RA and each of the partitions obtained by the SOM applied are computed) by using the results of the consensus obtained during the relational analysis. This method will allow to select the best map SOMi for each type of descriptor, and to use these maps for the browsing and information retrieval, which will provide a better response to the users requests, when they specify the type of descriptor in which they are interested.
2) The second variant consists to fusion the results obtained by the RA for all the descriptors and going back to search for the best maps (as previously). The advantage of this approach will be to search, for each type of descriptor, for the best map which takes account other descriptors.

Searching for the best map, is therefore, to find the partition closest to the "compromise" partition found by the relational analysis (or the most closely correlated with this partition). A number of mathematical indicators, known to those skilled in the domain, exist in the scientific literature for calculating this correlation.

Figure 6:
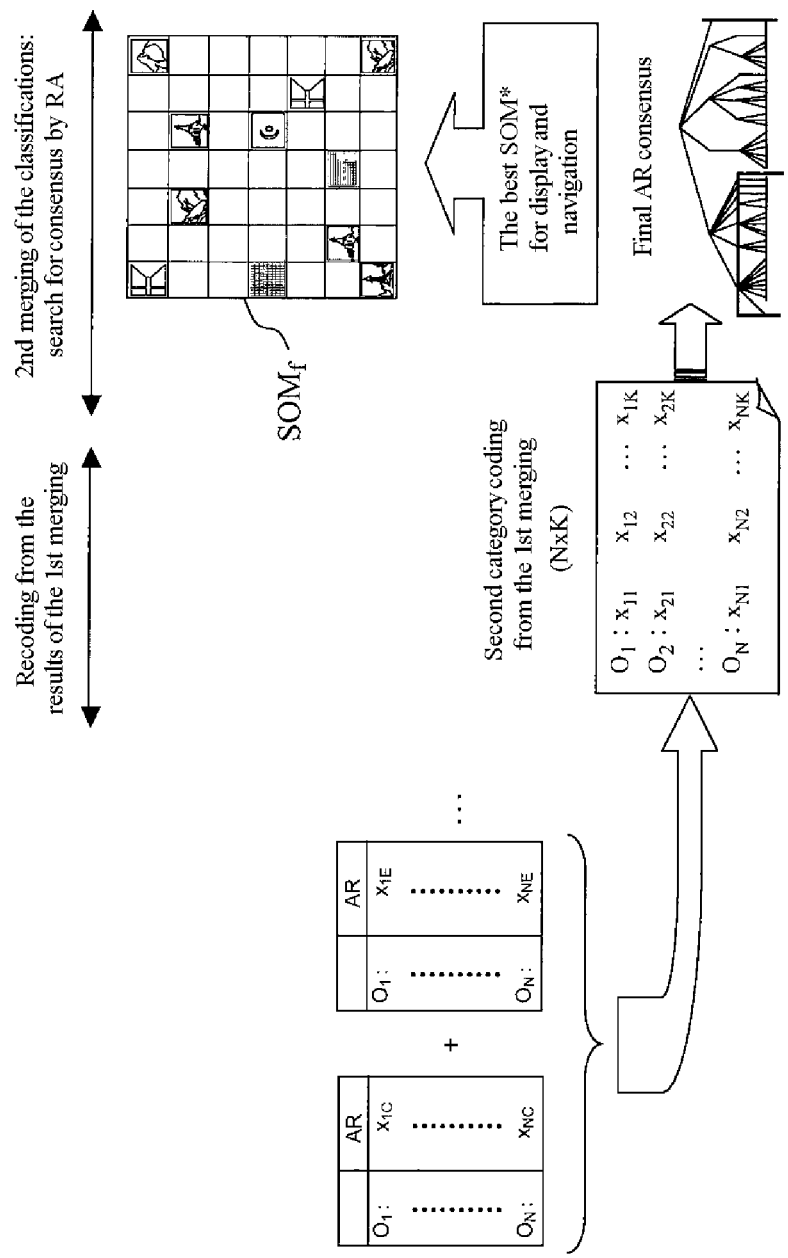

Based on the results of the first fusion, a second recoding of the data is performed. FIG. 6 is an illustration of the step $E_5$.

After having found the best map SOMi of each descriptor, there are K maps SOMi (one for each descriptor), considered as the K best maps. These K maps will be subjected to a relational analysis which will search for the compromise partition between all the partitions relative to the K SOM.

After this second recoding, the processor has a table of data N×K with N being the number of objects in the database and K the number of descriptors chosen in the first step $E_1$. The data in this new table $T_{NK}$ are presented in a similar form to that of the tables obtained in FIG. 5. Indeed, the number of columns will be equal to K and each column will quite simply be one of the columns obtained in FIG. 5 (the best among C SOM for the descriptor 1, the best among D SOM for the descriptor 2, etc.). The data are subjected to a relational analysis algorithm to obtain the consensus of the data and the search for an overall consensus. The consensus found by this algorithm represents a final classification that allows to select the best map SOMi or map SOMf which will be used as interface with the final user for the navigation and information retrieval. The advantage of this final fusion is to have the best classification of the database, independently of the type of descriptor. At this stage, a user may have a response in real time to a request without having to specify the type of descriptor.

Another functionality that can be added to the system will be the interactivity between the system and the final user to enhance or refine the classes obtained by the method. In practice, when a user makes a request, he will have one or more classes which correspond to his request. He may, possibly, remove one or more data (or images) that he judges to be badly classified and offer them to the system which will search for the best possible class for each object.

The user has the option to indicate that an item of information is relevant or not in relation to his request. This interaction with the user is reflected in an updating and refining of the classification. By being based on the topological properties of the SOM map, the system reclassifies the information according to the reaction of the user. This allows for an active evolution of the system.

The user, seeing a given class of images, may decide that one or more of the images of this class do not correspond to the observed class. This or these images will then be proposed to the system so that it can classify them in the most relevant class.

To summarize, the system according to the invention allows to classify and display data with very strong multimodal dimensionalities in a space with weak dimensionalities, or partitioning space, without having a prior information concerning the number of groups.

The first contribution consists in defining the fusion problem as a problem of meta-classification in a categorical variable space by an automatic classification technique (relational analysis). The second contribution consists in dealing with the fusion problem in a modular, cooperative and scalable manner. Indeed, this method is scalable relative to the data and relative to the users or experts. A backtracking or "backward" process for refining the results of the overall classification is introduced into the modular fusion process.

The use of unsupervised connectionist methods as means for recoding data (quantification) and of the relational analysis as fusion method allow for a hierarchical display of the results of the classification with a number of levels of details. The effectiveness of this method is illustrated with regard to a problem of searching for and rapidly accessing visual information in a database of images described by a set of numerical descriptors (color descriptors and texture descriptors) and textdescriptors (several thousand words extracted from web pages).

The invention claimed is:

1. An information retrieval system within a database including a processor and inputs/outputs, the system comprising:

a first module $E_1$ suitable for extracting the descriptors associated with each object in the database, and for constructing a table containing the objects and the value of a descriptor associated with an object, and do so for the descriptors chosen for the representation of the object, a second module $E_2$ suitable for applying a number of classification algorithms SOMi, for each of the tables $T_{Tk}$ obtained from the module $E_1$, in order to assign, for each object Oi, a class number xij, for an algorithm SOMi that is applied, for each category of descriptors, a third module $E_3$ suitable to fusion the results obtained from the module $E_2$ in order to determine, for each type of descriptor Tk, a class number associated with an object Oi, a fourth module $E_4$, suitable for finding which column SOMi of a table $T_{SI}$ is closest to the column obtained during the first fusion of the step $E_3$, and for selecting the map SOMi that is closest contained in the table $T_{SI}$, or best map SOMi, a fifth module $E_5$ suitable for merging the aggregate "best maps" SOMi, and applying an algorithm for searching for the best map SOMf to be transmitted to a display means.

2. The system according to claim 1, wherein the fusion algorithm is a relational analysis algorithm.

3. The system according to claim 1, wherein the object is an image and the extracted attributes are chosen from the following list: texture, color.

4. The system according to claim 1, wherein after the merging step executed in the module $E_3$, the method returns to search for the best map of type 1, then the best map of type N.

5. The system according to claim 1, wherein, after the merging step executed within the module $E_3$, the method takes the K results obtained from the fusion and merges them together by using a fusion technique, in order to obtain a single compromise partition to search for the best map for a type of descriptor.

* * * * *

UNITED STATES PATENT AND TRADEMARK OFFICE
CERTIFICATE OF CORRECTION

PATENT NO.        : 8,666,898 B2
APPLICATION NO.   : 13/139005
DATED             : March 4, 2014
INVENTOR(S)       : Benhadda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this
Twenty-ninth Day of September, 2015

Michelle K. Lee
*Director of the United States Patent and Trademark Office*